(12) United States Patent
Suh et al.

(10) Patent No.: US 12,412,884 B2
(45) Date of Patent: Sep. 9, 2025

(54) MANUFACTURING METHOD OF CATHODE ADDITIVES FOR LITHIUM SECONDARY BATTERY

(71) Applicant: LG Chem, Ltd., Seoul (KR)

(72) Inventors: Donghoon Suh, Daejeon (KR); Seokhyun Yoon, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 18/565,620

(22) PCT Filed: Oct. 18, 2022

(86) PCT No.: PCT/KR2022/015836
§ 371 (c)(1),
(2) Date: Nov. 30, 2023

(87) PCT Pub. No.: WO2023/068739
PCT Pub. Date: Apr. 27, 2023

(65) Prior Publication Data
US 2024/0145668 A1 May 2, 2024

(30) Foreign Application Priority Data

Oct. 19, 2021 (KR) .......................... 10-2021-0139619
Oct. 17, 2022 (KR) .......................... 10-2022-0133499

(51) Int. Cl.
*H01M 4/04* (2006.01)
*C01G 49/00* (2006.01)
(Continued)

(52) U.S. Cl.
CPC ...... *H01M 4/0471* (2013.01); *C01G 49/0027* (2013.01); *H01M 4/62* (2013.01);
(Continued)

(58) Field of Classification Search
None
See application file for complete search history.

(56) References Cited

U.S. PATENT DOCUMENTS

2009/0081102 A1 3/2009 Dai et al.
2020/0266447 A1 8/2020 Kim et al.
(Continued)

FOREIGN PATENT DOCUMENTS

CN 108183213 A 6/2018
CN 111725576 A 9/2020
(Continued)

OTHER PUBLICATIONS

Extended European Search Report for Application No. 22883962.7 dated Oct. 11, 2024, pp. 1-5.
(Continued)

*Primary Examiner* — Austin Murata
(74) *Attorney, Agent, or Firm* — Lerner David LLP

(57) ABSTRACT

The method includes mixing and heat-treating carbon nanotubes, a water-soluble polymer dispersant, and an iron (Fe) precursor to form an iron oxide-carbon precursor; mixing and calcining a lithium precursor and the iron oxide-carbon precursor at a temperature of 500° C. or higher to form lithium-iron oxide particles; and heat-treating a mixture containing the lithium-iron oxide particles and a lithium difluoro(oxalato)borate under an oxygen-containing gas atmosphere at a temperature of less than 300° C. to form a lithium-iron oxide coated with a lithium difluoro(oxalato) borate-containing layer.

11 Claims, 10 Drawing Sheets

(51) Int. Cl.
*H01M 4/62* (2006.01)
*H01M 4/02* (2006.01)
*H01M 10/0525* (2010.01)

(52) U.S. Cl.
CPC ...... *C01P 2002/50* (2013.01); *C01P 2004/80* (2013.01); *C01P 2006/40* (2013.01); *H01M 2004/028* (2013.01); *H01M 10/0525* (2013.01)

(56) References Cited

U.S. PATENT DOCUMENTS

| | | |
|---|---|---|
| 2020/0335790 A1 | 10/2020 | Han et al. |
| 2021/0351395 A1 | 11/2021 | Lu et al. |
| 2022/0181627 A1 | 6/2022 | Park et al. |
| 2023/0121840 A1 | 4/2023 | Cheng et al. |
| 2024/0258527 A1 | 8/2024 | Suh et al. |

FOREIGN PATENT DOCUMENTS

| | | | |
|---|---|---|---|
| CN | 111793824 | A | 10/2020 |
| CN | 113471415 | A | 10/2021 |
| JP | 5188573 | B2 | 4/2013 |
| JP | 2013164992 | A | 8/2013 |
| JP | 2014032777 | A | 2/2014 |
| JP | 2019085314 | A | 6/2019 |
| JP | 2019085315 | A | 6/2019 |
| JP | 2020050553 | A | 4/2020 |
| JP | 2020053314 | A | 4/2020 |
| JP | 2020513145 | A | 4/2020 |
| KR | 20170024918 | A | 3/2017 |
| KR | 20190062254 | A | 6/2019 |
| KR | 20190095115 | A | 8/2019 |
| KR | 20200066048 | A | 6/2020 |
| KR | 20210064360 | A | 6/2021 |
| KR | 20220061549 | A | 5/2022 |
| WO | 2011025276 | A2 | 3/2011 |
| WO | 2023048550 | A1 | 3/2023 |

OTHER PUBLICATIONS

Mengqing Xu et al: "Investigation and application of lithium difluoro(oxalate)borate (LiDFOB) as additive to improve the thermal stability of electrolyte for lithium-ion batteries", Journal of Power Sources, Elsevier, Amsterdam, NL, vol. 196, No. 16, Oct. 18, 2010 (Oct. 18, 2010), 6794-6801, XP028226106.

Liu et al: "Lithium difluoro(oxalato)borate as a functional additive for lithium-ion batteries", Electrochemistry Communications, Elsevier Amsterdam, NL, vol. 9, No. 3, Mar. 13, 2007 (Mar. 13, 2007), pp. 475-479, XP005920476.

Yang, L. et al. "Inorganic additives for passivation of high voltage cathode materials," Elsevier Journal of Power Sources, Oct. 2010, 196, pp. 2251-2254.

International Search Report for PCT/KR2022/015836 mailed Feb. 3, 2023. 3 pages.

[FIG. 1]
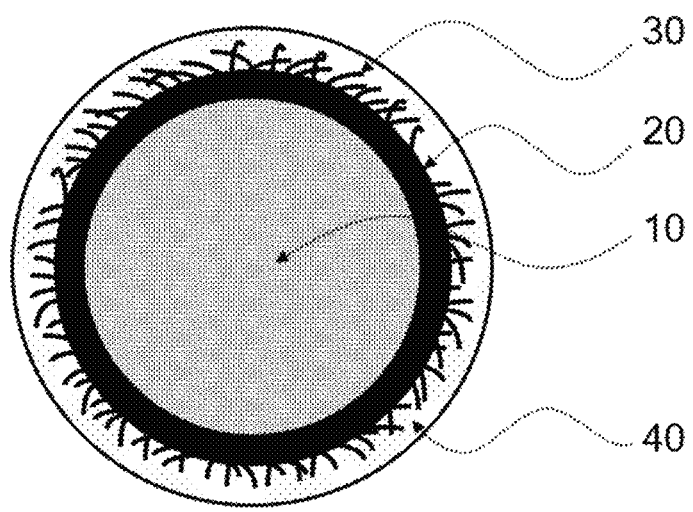
[FIG. 2]
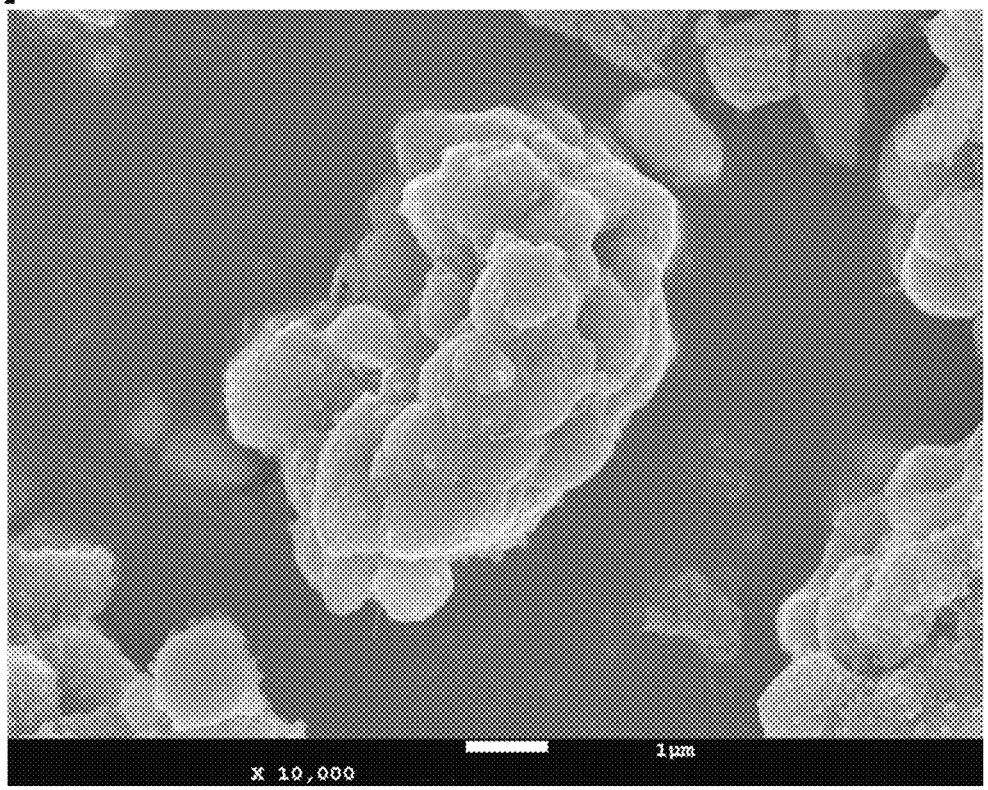

[FIG. 3]
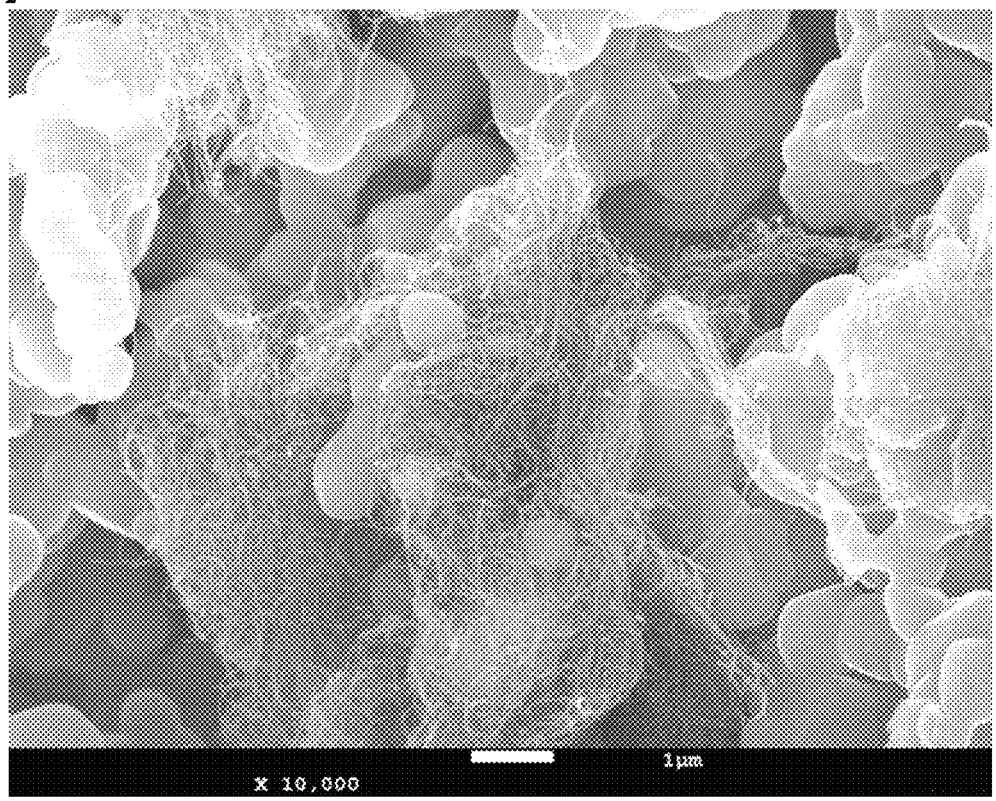

MANUFACTURING METHOD OF CATHODE ADDITIVES FOR LITHIUM SECONDARY BATTERY

CROSS-REFERENCE TO RELATED APPLICATIONS

This application is a national phase entry under 35 U.S.C. § 371 of International Application No. PCT/KR2022/015836, filed on Oct. 18, 2022, which claims the benefits of Korean Patent Application Nos. 10-2021-0139619 filed on Oct. 19, 2021, and 10-2022-0133499 filed on Oct. 17, 2022, the disclosures of which are incorporated herein by reference in their entireties.

TECHNICAL FIELD

The present disclosure relates to a cathode additive for a lithium secondary battery.

BACKGROUND OF ART

As power consumption increases with the multifunctionalization of electronic devices, many attempts have been made to increase the capacity of a lithium secondary battery and improve charge/discharge efficiency thereof.

As one example, there has been a proposal for a technique, in which a cathode active material of at least 80% Ni is applied to a cathode of a lithium secondary battery as a cathode material, and a metal or metal-based anode active material such as SiO, Si or SiC is applied to an anode along with a carbon-based anode active material such as natural graphite, artificial graphite or the like.

The metal and metal oxide-based anode active material enables a higher capacity than the carbon-based anode active material. However, in the case of the metal and metal oxide-based anode active material, a volume change during charging and discharging is much larger than that of graphite, and thus it is difficult to increase the content of metals and metal oxides in the anode to 15% or more. In addition, when the metals and metal oxides are added into the anode, an irreversible reaction occurs in the initial charge and discharge, and thus the loss of lithium is larger than when a carbon-based anode active material is applied. Thus, when the metal and metal oxide-based anode active material is applied, the amount of lithium lost increases as the capacity of the battery increases, and thus a degree of decrease in the initial capacity also increases.

Accordingly, a study has been conducted on various methods for increasing the capacity of the lithium secondary battery or reducing the irreversible capacity. One of the methods is prelithiation, which is a concept of replenishing lithium consumed in the formation of a solid electrolyte interphase (SEI) layer in an initial state in the battery.

Various methods have been proposed for prelithiation in the battery.

As one example, there is a method of electrochemically lithiating the anode before driving the battery. However, the lithiated anode is very unstable in the atmosphere, and the electrochemical lithiation method is difficult to scale-up the process.

As another example, there is a method of coating the anode with lithium metal or lithium silicide ($Li_xSi$) powder. However, the powder has low atmospheric stability due to high reactivity, and thus causing a problem in establishing a suitable solvent and process conditions when coating the anode.

As a prelithiation method in the cathode, there is a method of coating with the cathode material as much as the amount of lithium consumed in the anode. However, due to the low capacity of the cathode material per se, the amount of the added cathode material increases, and the energy density and capacity per weight of the final battery decrease as much as the amount of the increased cathode material.

Accordingly, a material suitable for prelithiation of the battery in the cathode needs to have an irreversible property in which lithium is desorbed at least twice as much as that of a conventional cathode material during initial charge of the battery and the material does not react with lithium during subsequent discharge. An additive satisfying the above conditions is referred to as sacrificial positive electrode materials.

A commercial battery is subjected to a formation process in which an electrolyte is injected into a case including a stacked cathode, a separator, and an anode, and then a charge/discharge operation is performed for the first time. In this process, an SEI layer formation reaction occurs on the anode, and gas is generated due to the decomposition of the electrolyte. In the formation process, the sacrificial positive electrode material reacts with the electrolyte while releasing lithium and decomposing, and gases such as $N_2$, $O_2$, $CO_2$, etc., generated in the process are recovered through a gas pocket removal process.

As the sacrificial positive electrode material, over-lithiated positive electrode materials, which are lithium-rich metal oxides, are widely used. As the over-lithiated positive electrode materials, $Li_6CoO_4$, $Li_5FeO_4$, $Li_6MnO_4$ and the like, which have an anti-fluorite structure, are well known. In terms of a theoretical capacity, $Li_6CoO_4$ has 977 mAh/g, $Li_5FeO_4$ has 867 mAh/g, and $Li_6MnO_4$ has 1001 mAh/g, which are sufficient for use as a sacrificial positive electrode material. Among the above, $Li_6CoO_4$ has the most excellent electrical conductivity and thus has good electrochemical properties for use as a sacrificial positive electrode material.

However, the $Li_5FeO_4$ sacrificial positive electrode material rapidly deteriorates in performance when exposed to air due to poor air stability, and has insufficient irreversible capacity due to low electrical conductivity. As a result, in order to compensate for large irreversible capacity of a high-capacity lithium secondary battery, there is a problem in that a considerable amount of $Li_5FeO_4$ should be added. This has become an impediment to recent technological development for providing a lithium secondary battery with a lower weight and improved capacity. Accordingly, there is a continuous demand for the development of a $Li_5FeO_4$-based sacrificial positive electrode material having a larger irreversible capacity.

DETAILED DESCRIPTION OF THE INVENTION

Technical Problem

In the present disclosure, there is provided a manufacturing method of a cathode additive for a lithium secondary battery having excellent air stability while exhibiting high initial irreversible capacity.

Technical Solution

According to one embodiment of the present disclosure, there is provided a manufacturing method of a cathode additive for a lithium secondary battery, including the steps of:

mixing and heat-treating carbon nanotubes, a water-soluble polymer dispersant, and an iron (Fe) precursor to form an iron oxide-carbon precursor;

mixing and calcining a lithium precursor and the iron oxide-carbon precursor at a temperature of 500° C. or higher to form a lithium-iron oxide particle; and heat-treating a mixture containing the lithium-iron oxide particles and lithium difluoro(oxalato)borate under an oxygen-containing gas atmosphere at a temperature of less than 300° C. to form a lithium-iron oxide coated with a lithium difluoro(oxalato)borate-containing layer.

Hereinafter, the manufacturing method of a cathode additive for a lithium secondary battery according to the embodiment of the present invention will be described in more detail.

The terms or words used in the present disclosure and claims should not be construed as being limited to their ordinary or dictionary meanings and should be interpreted as a meaning and concept consistent with the technical idea of the invention based on the principle that the inventors may properly define the concept of the terms in order to best describe their own inventions.

Unless otherwise defined in the present disclosure, all technical and scientific terms have the same meaning as commonly understood by those skilled in the art to which the present invention pertains. The terms used in the description of the present invention is intended for the purpose of effectively describing particular embodiments only and is not intended to limit the present invention.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, components and/or groups.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, when a positional relationship of two parts is described as, for example, "on ~", "at an upper part of ~", "at a lower part of ~", "next to ~", etc., one or more other parts may be placed between the two parts unless an expression of "immediately" or "directly' is used.

In the present disclosure, when a temporal relationship is described as, for example, "after ~", "following ~", "subsequent to ~", "before ~", etc., cases in which events are not continuous may be included, unless an expression of "immediately" or "directly' is used.

In the present disclosure, it should be understood that the term "at least one" includes all possible combinations from one or more related items.

As used herein, the term "cathode additive" may refer to a material having an irreversible property in which lithium is desorbed at least twice as much as that of a conventional cathode material during initial charge of the battery and the material does not react with lithium during subsequent discharge. The cathode additive may be referred to as sacrificial positive electrode materials. Since the cathode additive compensates for the loss of lithium, as a result, the capacity of the battery may be increased by restoring the lost capacity of the battery, and the gas generation may be suppressed to prevent the battery from exploding, thereby improving lifespan and safety of the battery.

The present inventors continued research to improve air stability while improving electrical conductivity and irreversible capacity of a $Li_5FeO_4$-based cathode additive (sacrificial positive electrode material) in a more simplified manner.

As a result of such continuous research, it was confirmed that the cathode additive in the form of a double coating layer in which the carbon coating layer derived from a water-soluble polymer dispersant and the carbon nanotube-containing layer were respectively formed on $Li_5FeO_4$-based lithium transition metal oxide particles could be obtained by adding a dispersion in which carbon nanotubes are dispersed in the presence of a water-soluble polymer dispersant, followed by calcination in the process of manufacturing a $Li_5FeO_4$-based cathode additive. Furthermore, a lithium difluoro(oxalato)borate-containing layer is formed on the surface of the cathode additive in the form of a double coating layer under an oxygen-containing gas atmosphere. A schematic cross-section of the cathode additive according to the embodiment may have a structure as shown in FIG. 1.

The cathode additive may have excellent electrical conductivity and high irreversible capacity compared to previously known $Li_5FeO_4$-based cathode additives, since a carbon nanotube-containing layer having similar electrical conductivity is formed on the $Li_5FeO_4$-based lithium transition metal oxide particles.

In addition, a uniform carbon coating layer derived from the water-soluble polymer dispersant is formed on the surface of the lithium transition metal oxide particles, and a relatively high proportion of carbon nanotubes may be uniformly bonded on the carbon coating layer. Therefore, the cathode additive of one embodiment may have higher electrical conductivity and irreversible capacity.

In addition, since the surface of the cathode additive is coated with a lithium difluoro(oxalato)borate-containing layer, it can exhibit excellent stability against moisture and carbon dioxide even when exposed to air.

In contrast, the cathode additive in which only the carbon coating layer derived from the polymer dispersant is formed is difficult to have sufficient irreversible capacity, because it is difficult to improve electrical conductivity. In addition, in the cathode additive in which the carbon nanotubes are formed directly on the additive particles, it is also difficult for the carbon nanotubes to be uniformly bonded to the additive particles at a high proportion, and thus improvement in electrical conductivity, irreversible capacity, and/or capacity characteristics during charging and discharging is not sufficient.

In the cathode additive for a lithium secondary battery, a high proportion of carbon nanotubes can be uniformly bonded to lithium transition metal oxide particles due to the interaction of the carbon coating layer and the carbon nanotube-containing layer, so that electrical conductivity, irreversible capacity and capacity characteristics during charging and discharging can be greatly improved. In addition, the lithium difluoro(oxalato)borate-containing layer formed on the carbon nanotube-containing layer enables air stability to be improved, so that electrical conductivity, irreversible capacity, and capacity characteristics during charging and discharging of the cathode additive can be stably expressed.

According to one embodiment of the present disclosure, there is provided a manufacturing method of a cathode additive for a lithium secondary battery, comprising the steps of:

forming an iron oxide-carbon precursor by mixing and heat-treating carbon nanotubes, a water-soluble polymer dispersant, and an iron (Fe) precursor;

forming lithium-iron oxide particles by mixing and calcining a lithium precursor and the iron oxide-carbon precursor at a temperature of 500° C. or higher; and forming a lithium-iron oxide coated with a lithium difluoro(oxalato)borate-containing layer by heat-treating a mixture containing the lithium-iron oxide particles and lithium difluoro(oxalato)borate under an oxygen-containing gas atmosphere at a temperature of less than 300° C.

In one specific example, the step of forming the iron oxide-carbon precursor may include the steps of: forming a carbon nanotube dispersion in which the carbon nanotubes are dispersed in an aqueous medium in the presence of the water-soluble polymer dispersant; mixing the carbon nanotube dispersion and an iron (Fe) precursor in the presence of a base; reacting the carbon nanotube dispersion and the iron (Fe) precursor in the mixture at a temperature of 50° C. to 100° C.; and filtering and drying the reaction product solution, followed by heat-treating at a temperature of 200° C. to 300° C.

The iron oxide-carbon precursor is mixed with a lithium precursor and calcined at a high temperature to form $Li_5FeO_4$-based lithium transition metal oxide particles (i.e., lithium-iron oxide particles). At the same time, the water-soluble polymer dispersant is calcined on the surface of the lithium-iron oxide particles to form a uniform carbon coating layer. Carbon nanotubes may be bonded to the carbon coating layer. In addition, the lithium-iron oxide particles and the lithium difluoro(oxalato)borate (LiDFOB) are mixed and calcined under an oxygen-containing gas atmosphere at a temperature of less than 300° C. to obtain lithium-iron oxide particles coated with a LiDFOB-containing layer.

Hereinafter, the manufacturing method of the cathode additive for a lithium secondary battery of one embodiment will be described step by step.

A step of mixing and heat-treating carbon nanotubes, a water-soluble polymer dispersant, and an iron (Fe) precursor to form an iron oxide-carbon precursor is performed.

As the water-soluble polymer dispersant, any water-soluble polymer may be used as long as it can uniformly disperse carbon nanotubes in an aqueous medium and form the carbon coating layer by calcination. Preferably, the water-soluble polymer dispersant may include at least one compound selected from the group consisting of polyvinylpyrrolidone-based polymers, polyacrylic acid-based polymers, polyvinyl alcohol-based polymers, and hydroxyalkyl cellulose-based polymers.

The water-soluble polymer dispersant and the carbon nanotubes may be dispersed and mixed in an aqueous medium by, for example, ultrasonic spraying to form a carbon nanotube dispersion. Then, the carbon nanotube dispersion is mixed with an iron precursor or an aqueous solution thereof, and may be mixed with a base such as ammonium hydroxide.

In order to form a carbon coating layer having an appropriate thickness and content, the water-soluble polymer dispersant may be used in an amount of 0.1 parts by weight to 2 parts by weight, 0.5 parts by weight to 2 parts by weight, or 0.5 parts by weight to 1.5 parts by weight based on a total amount of the iron oxide-carbon precursor.

Further, in order to form an appropriate amount of the carbon nanotube-containing layer on the carbon coating layer, the carbon nanotubes may be used in an amount of 1 parts by weight to 10 parts by weight, 2 parts by weight to 10 parts by weight, or 2 parts by weight to 7 parts by weight based on a total amount of the iron oxide-carbon precursor.

The iron (Fe) precursor may include one or more compounds selected from the group consisting of nitric oxides, sulfur oxides, phosphates, oxides, halides, and hydrates of Fe(III).

As described above, after mixing the carbon nanotube dispersion and the iron precursor, the carbon nanotube dispersion and the iron precursor are stirred, and a base such as ammonium hydroxide ($NH_4OH$) is added in an equivalent ratio of the iron precursor. Then, a reaction is performed at a temperature of 50° C. to 100° C., or 70° C. to 90° C. for 1 hour to 10 hours, the reaction product solution is filtered and dried, and then additional heat-treatment is performed at a temperature of 200° C. to 300° C., or 220° C. to 280° C. for 2 hours to 15 hours, or 6 hours to 12 hours to remove impurities. In this case, the drying step may be performed using a general oven or the like, and an iron oxide-carbon precursor may be formed through this process.

Subsequently, a step of forming lithium-iron oxide particles by mixing and calcining a lithium precursor and the iron oxide-carbon precursor at a temperature of 500° C. or higher is performed.

The iron oxide-carbon precursor may be mixed with a lithium precursor and then calcined at a temperature of 500° C. or more, 500° C. to 1000° C., or 550° C. to 700° C. to form lithium-iron oxide.

At this time, since the reaction between the iron oxide-carbon precursor and the lithium precursor may proceed in an equivalent reaction. For example, when the lithium precursor is a lithium oxide such as $Li_2O$, the iron oxide-carbon precursor and the lithium precursor are mixed at a molar ratio of 1:5, and high-temperature calcination may be performed.

As the lithium precursor, a lithium precursor well known in the art may be used in addition to the lithium oxide ($Li_2O$).

Then, a step of forming a lithium-iron oxide coated with a LiDFOB-containing layer is performed by heat-treating a mixture containing the lithium-iron oxide particles and lithium difluoro(oxalato)borate (hereinafter, referred to as 'LiDFOB') under an oxygen-containing gas atmosphere at a temperature of less than 300° C.

Mixing of the lithium-iron oxide particles and LiDFOB may be performed by solid-phase mixing using a conventional mixer.

In particular, the heat-treatment of the mixture may be performed under an oxygen-containing gas atmosphere at a temperature of less than 300° C.

Preferably, the oxygen-containing gas may be air.

The lithium-iron oxide such as $Li_5FeO_4$ reacts with carbon dioxide ($CO_2$) and moisture ($H_2O$) in air when exposed to air to change into $Li_2CO_3$ or LiOH. Therefore, it can be expected that it is not preferable to heat-treat the lithium-iron oxide particles in air, which is an oxygen-containing gas, in the above step. However, unlike the above expectation, when heat-treating the mixture of the lithium-iron oxide particles and LiDFOB under an air atmosphere at a temperature of less than 300° C., a lithium-iron oxide coated with a LiDFOB-containing layer having excellent air stability can be obtained.

Preferably, the step of forming the lithium-iron oxide coated with a LiDFOB-containing layer may be performed by heat-treating the mixture under an air atmosphere at a temperature of less than 300° C., 260° C. to 295° C., 260° C. to 290° C., 265° C. to 285° C., or 270° C. to 280° C.

When performing the heat-treatment of the mixture under an oxygen-containing gas atmosphere, a cathode additive for a lithium secondary battery having improved air stability may be obtained compared to a case in which the heat-treatment is performed under a typical inert gas atmosphere.

Optionally, the mixture may be subjected to first heat-treatment under an inert gas atmosphere, and then second heat-treatment under an oxygen-containing gas atmosphere.

In one specific example, the step of forming the lithium-iron oxide coated with a LiDFOB-containing layer may be performed by including the steps of: first heat-treating a mixture containing the lithium-iron oxide particles and LiDFOB under an inert gas atmosphere at a temperature of less than 300° C., and secondly heat-treating the result of the first heat-treatment under an oxygen-containing gas atmosphere at a temperature of less than 300° C.

Herein, the temperature of the first heat-treatment and the second heat-treatment may each independently be less than 300° C., 260° C. to 295° C., 260° C. to 290° C., 265° C. to 285° C., or 270° C. to 280° C.

The LiDFOB may be used in an amount of 5.0 parts by weight to 20.0 parts by weight, 5.5 parts by weight to 19.0 parts by weight, 6.0 parts by weight to 18.5 parts by weight, 6.5 parts by weight to 18.0 parts by weight, 7.0 parts by weight to 17.5 parts by weight, 7.5 parts by weight to 17.0 parts by weight parts by weight, 8.0 parts by weight to 16.5 parts by weight, 8.0 parts by weight to 16.0 parts by weight, 8.0 parts by weight to 15.5 parts by weight, or 8.0 parts by weight to 15.0 parts by weight based on a total amount of the lithium-iron oxide particles.

An additive such as lithium hexafluorophosphate, lithium triflate, and lithium difluorophosphate may be further mixed with LiDFOB. In order to sufficiently achieve the effect of improving air stability by the introduction of the LiDFOB-containing layer, the LiDFOB-containing layer preferably contains 50 mol % or more, 70 mol % or more, or 90 mol % or more of LiDFOB.

If necessary, a step of washing and drying the lithium-iron oxide coated with the LiDFOB-containing layer may be performed.

As a non-limiting example, the washing process may be performed by mixing the lithium-iron oxide particles and a washing solution at a weight ratio of 1:2 to 1:10, followed by stirring. Distilled water, ammonia water, etc. may be used as the washing solution. The drying may be performed by heat-treatment at a temperature of 100° C. to 200° C., or 100° C. to 180° C. for 1 hour to 10 hours.

Meanwhile, the cathode additive for a lithium secondary battery obtained by the manufacturing method includes the lithium-iron oxide particles; a carbon coating layer formed on the lithium-iron oxide particles; a carbon nanotube-containing layer formed on the carbon coating layer; and a lithium difluoro(oxalato)borate-containing layer formed on the carbon nanotube-containing layer.

The cathode additive basically includes lithium-iron oxide particles containing a compound of $Li_5FeO_4$. The lithium transition metal oxide particles such as $Li_5FeO_4$ contains lithium at a higher ratio than its stoichiometric ratio. Excessive lithium ions may migrate to the anode during initial charge and discharge to compensate for the loss of irreversible capacity.

The cathode additive may further include lithium transition metal oxides such as $Li_2NiO_2$ and $Li_6CoO_4$ known in the art in addition to the lithium-iron oxide such as $Li_5FeO_44$. However, in consideration of manufacturing cost and physical properties of the cathode additive, the cathode additive preferably includes 50 mol % or more, 70 mol % or more, or 90 mol % or more of $Li_5FeO_4$ as the lithium transition metal oxide.

The lithium-iron oxide particles may be primary particles having a volume average particle diameter (D50) of 0.5 μm to 45 μm, 1 μm to 25 μm, or 5 μm to 15 μm, or secondary particles in which the primary particles are aggregated. Within the particle diameter range, the lithium-iron oxide particles may be uniformly mixed with the cathode active material to exhibit appropriate characteristics in the cathode.

In order to have an appropriate particle size distribution and a volume average particle diameter, the lithium-iron oxide particles are synthesized, and then may be passed through a standard sieve having a size corresponding to a desired particle size distribution. The particle size distribution and volume average particle diameter (D50) of the lithium-iron oxide particles may be measured and calculated using a well-known laser particle size analyzer.

In the cathode additive, a carbon coating layer and a carbon nanotube-containing layer including carbon nanotubes physically or chemically bonded to the carbon coating layer may be formed on the lithium transition metal oxide particles. The formation of the carbon coating layer and the carbon nanotube-containing layer may be confirmed by electron microscopy or XRD analysis of the cathode additive.

According to an embodiment of the present disclosure, the sum of the contents of the carbon coating layer and the carbon nanotube-containing layer may be 0.5 parts by weight to 6.0 parts by weight, 1.0 parts by weight to 6.0 parts by weight, 1.0 parts by weight to 5.9 parts by weight, 1.5 parts by weight to 5.9 parts by weight, or 1.5 parts by weight to 5.8 parts by weight based on 100 parts by weight of a total weight of the cathode additive.

In addition, the carbon coating layer and the carbon nanotube-containing layer may be included at a weight ratio of 1:4 to 1:50, 1:8 to 1:50, 1:8 to 1:30, 1:10 to 1:30, or 1:10 to 1:20.

As the total content of the carbon coating layer and the carbon nanotube-containing layer and their weight ratio are controlled within the above range, characteristics such as irreversible capacity of the lithium transition metal oxide particles are not impaired by the carbon coating layer, and a high proportion of carbon nanotubes are uniformly bonded on the carbon coating layer, thereby further improving electrical conductivity, irreversible capacity and capacity characteristics during charging and discharging.

In a specific embodiment, the carbon coating layer may be included in an amount of 0.05 parts by weight to 2.0 parts by weight, 0.06 parts by weight to 2.0 parts by weight, or 0.06 parts by weight to 1.9 parts by weight based on 100 parts by weight of a total weight of the cathode additive. The carbon nanotube-containing layer may be included in an amount of 0.4 parts by weight to 4.0 parts by weight, 0.8 parts by weight to 4.0 parts by weight, 0.8 parts by weight to 3.95 parts by weight, 1.0 parts by weight to 3.95 parts by weight, or 1.0 parts by weight to 3.90 parts by weight based on 100 parts by weight of a total weight of the cathode additive.

Each content or total content of the carbon coating layer and the carbon nanotube-containing layer may be measured and calculated by analyzing the carbon content of the surface of the cathode additive through a well-known elemental analysis, or by using the content of the water-soluble polymer dispersant and carbon nanotubes used as raw materials.

In the cathode additive, the carbon coating layer may have a thickness of 10 nm to 300 nm. In addition, the carbon nanotubes of the carbon nanotube-containing layer may be physically and uniformly adsorbed or chemically bonded on the carbon coating layer. Due to the thickness of the carbon coating layer and the bonding shape of the carbon nanotubes, the cathode additive of one embodiment may exhibit optimized irreversible capacity and capacity characteristics during charging and discharging.

The thickness of the carbon coating layer can be calculated based on the BET specific surface area of the cathode additive and the analysis result of the carbon content, or measured by analyzing the cathode additive with a transmission electron microscope (TEM) or a scanning transmission electron microscope (STEM).

Meanwhile, the cathode additive includes a LiDFOB-containing layer formed on the carbon nanotube-containing layer.

The surface of the cathode additive is coated with the LiDFOB-containing layer. Referring to FIG. 1, the cathode additive includes the carbon coating layer 20 formed on the lithium-iron oxide particles 10, the carbon nanotube-containing layer 30 formed on the carbon coating layer 20, and the LiDFOB-containing layer 40 formed on the carbon nanotube-containing layer 30. The LiDFOB-containing layer 40 is physically or chemically bonded to the carbon nanotube-containing layer 30 formed on the carbon coating layer 20.

According to an embodiment of the present disclosure, the LiDFOB-containing layer may be made of only LiDFOB. In addition, the LiDFOB-containing layer may include an additive such as lithium hexafluorophosphate, lithium triflate, and lithium difluorophosphate known in the field of lithium secondary batteries together with LiDFOB. In order to sufficiently achieve the effect of improving air stability by the introduction of the LiDFOB-containing layer, the LiDFOB-containing layer preferably contains 50 mol % or more, 70 mol % or more, or 90 mol % or more of LiDFOB.

The formation of the LiDFOB-containing layer may be confirmed by electron microscopy or XRD analysis of the cathode additive.

According to an embodiment of the present disclosure, the LiDFOB-containing layer may be included in an amount of 5.0 parts by weight to 15.0 parts by weight, 5.5 parts by weight to 15.0 parts by weight, 5.5 parts by weight to 12.0 parts by weight, 5.5 parts by weight to 10.0 parts by weight, 6.0 parts by weight to 10.0 parts by weight, or 6.0 parts by weight to 9.0 parts by weight based on 100 parts by weight of a total weight of the cathode additive.

In order to sufficiently achieve the effect of improving air stability of the cathode additive, the LiDFOB-containing layer is preferably included in an amount of 5.0 parts by weight or more based on 100 parts by weight of a total amount of the cathode additive. However, when the LiDFOB-containing layer is excessively included, irreversible capacity of the cathode additive and capacity characteristics during charging and discharging may be deteriorated. Therefore, the amount of the LiDFOB-containing layer is preferably 15.0 parts by weight or less based on 100 parts by weight of a total weight of the cathode additive.

The cathode additive described above may be mixed with a separate cathode active material to act as a sacrificial positive electrode material that compensates for the irreversible capacity of the anode during the initial charge and discharge of a lithium secondary battery, and then the cathode active material may act after such irreversible capacity compensation. In addition, since the cathode additive has improved capacity characteristics during charging and discharging, it can be preferably applied as an additional cathode active material.

According to another embodiment of the present disclosure, there is provided a cathode for a lithium secondary battery.

The cathode for a lithium secondary battery may include a cathode active material, a binder, a conductive material, and the cathode additive.

The cathode additive has a property of irreversibly releasing lithium during charging and discharging of the lithium secondary battery. Thus, the cathode additive is included in the cathode for a lithium secondary battery, and functions as a sacrificial positive electrode material for prelithiation.

Preferably, the cathode for a lithium secondary battery includes a cathode material containing a cathode active material, the cathode additive, and a binder; and a current collector for supporting the cathode material.

In the case of a high-capacity battery, a proportion of the anode active material in the proportion needs to be more increased in order to increase the battery capacity, and thus the amount of lithium consumed in an SEI layer is also increased. Thus, after calculating the amount of lithium consumed in the SEI layer of the anode, the amount of the sacrificial positive electrode material to be applied to the cathode may be inversely calculated to determine the design capacity of the battery.

According to one embodiment, the cathode additive may be included in an amount of more than 0 wt % and 15 wt % or less based on a total weight of the cathode material.

It is preferable that the content of the cathode additive is more than 0 wt % based on a total weight of the cathode material in order to compensate for irreversible lithium consumed in the formation of the SEI layer.

However, when an excessive amount of the cathode additive is included, the content of the cathode active material exhibiting a reversible charge/discharge capacity may be decreased to reduce the capacity of the battery, and residual lithium in the battery may be plated on the anode, thereby causing a short circuit of the battery or hindering safety. Thus, it is preferable that the content of the cathode additive is 15 wt % or less based on a total weight of the cathode material.

Specifically, the content of the cathode additive is more than 0 wt %, 0.5 wt % or more, 1 wt % or more, 2 wt % or more, or 3 wt % or more; and 15 wt % or less, 12 wt % or less, or 10 wt % or less based on a total weight of the cathode material.

Preferably, the content of the cathode additive may be 0.5 wt % to 15 wt %, 1 wt % to 15 wt %, 1 wt % to 12 wt %, 2 wt % to 12 wt %, 2 wt % to 10 wt %, or 3 wt % to 10 wt % based on a total weight of the cathode material.

As the cathode active material, any material capable of reversibly intercalating and deintercalating lithium ions may be used without particular limitation. For example, the cathode active material may be a composite oxide or a phosphorus oxide containing cobalt, manganese, nickel, iron, or a combination thereof and lithium.

As a non-limiting example, the cathode active material may be a compound represented by any one of the following formulae.

$Li_aA_{1-b}R_bD_2$ (0.90≤a≤1.8, 0≤b≤0.5); $Li_aE_{1-b}R_bO_{2-c}D_c$ (0.90≤a≤1.8, 0≤b≤0.5, 0≤c≤0.05); $LiE_{2-b}R_bO_{4-c}D_c$ (0≤b≤0.5, 0≤c≤0.05); $Li_aNi_{1-b-c}Co_bR_cD_d$ (0.90≤a≤1.8, $0 \leq b \leq 0.5$, $0 \leq c \leq 0.05$, $0 < d \leq 2$); $Li_aNi_{1-b-c}Co_bR_cO_{2-d}Z_d$ ($0.90 \leq a \leq 1.8$, $0 \leq b \leq 0.5$, $0 \leq c \leq 0.05$, $0 < d < 2$); $Li_aNi_{1-b-c}Co_bR_cO_{2-d}Z_2$ ($0.90 \leq a \leq 1.8$, $0 \leq b \leq 0.5$, $0 \leq c \leq 0.05$, $0 < d < 2$); $Li_aNi_{1-b-c}Mn_bR_cD_d$ ($0.90 \leq a \leq 1.8$, $0 \leq b \leq 0.5$, $0 \leq c \leq 0.05$, $0 < d \leq 2$); $Li_aNi_{1-b-c}Mn_bR_cO_{2-d}Z_d$ ($0.90 \leq a \leq 1.8$, $0 \leq b \leq 0.5$, $0 \leq c \leq 0.05$, $0 < d < 2$); $Li_aNi_{1-b-c}Mn_bR_cO_{2-d}Z_2$ ($0.90 \leq a \leq 1.8$, $0 \leq b \leq 0.5$, $0 \leq c \leq 0.05$, $0 < d < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above formulae, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, one having a coating layer on the surface of the cathode active material may be used, or a cathode active material having a coating layer may be used together with the cathode active material. As the coating element included in the coating layer, Mg, Al, Co, K, Na, Ca, Si, Ti, V, Sn, Ge, Ga, B, As, Zr, or a mixture thereof may be used.

According to one embodiment, the cathode active material may be included in an amount of 80% to 95 wt % based on a total weight of the cathode material.

Specifically, the content of the cathode active material may be 80 wt % or more, 82 wt % or more, or 85 wt % or more; and 95 wt % or less, 93 wt % or less, or 90 wt % or less based on a total weight of the cathode material.

Preferably, the content of the cathode active material may be 82 wt % to 95 wt %, 82 wt % to 93 wt %, 85 wt % to 93 wt %, or 85 wt % to 90 wt % based on a total weight of the cathode material.

The conductive material is used to impart conductivity to the electrode.

A conductive material may be used without any particular limitation as long as it has electronic conductivity without causing a chemical change in the battery. As a non-limiting example, the conductive material may include a carbon-based material such as carbon black, acetylene black, ketjen black, channel black, furnace black, lamp black, summer black, carbon fiber, etc.; graphite such as natural graphite, artificial graphite, etc.; metal powders or metal fibers such as copper, nickel, aluminum, silver, etc.; conductive whiskeys such as zinc oxide, potassium titanate, etc.; conductive metal oxides such as titanium oxide, etc.; a conductive polymer such as a polyphenylene derivative, etc.; or the like. As the conductive material, one or a mixture of two or more of the above-described examples may be used.

The content of the conductive material may be adjusted in a range that does not cause a decrease in the capacity of the battery while expressing an appropriate level of conductivity. Preferably, the content of the conductive material may be 1 wt % to 10 wt %, or 1 wt % to 5 wt % based on a total weight of the cathode material.

The binder is used to attach the cathode material well to the current collector.

As a non-limiting example, the binder may be polyvinyl alcohol, carboxymethylcellulose, hydroxypropylcellulose, diacetylcellulose, polyvinylchloride, carboxylated polyvinylchloride, polyvinylfluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like. As the binder, one or a mixture of two or more of the above examples may be used.

The content of the binder may be adjusted in a range that does not cause a decrease in the capacity of the battery while expressing an appropriate level of adhesiveness. Preferably, the content of the binder may be 1 wt % to 10 wt %, or 1 wt % to 5 wt % based on a total weight of the cathode material.

As the current collector, a material known to be applicable to the cathode of a lithium secondary battery in the art to which the present invention pertains may be used without particular limitation.

As a non-limiting example, the current collector used herein may include stainless steel; aluminum; nickel; titanium; calcined carbon; aluminum or stainless steel surface treated with carbon, nickel, titanium, silver, etc.; or the like.

Preferably, the current collector may have a thickness of 3 μm to 500 μm. In order to increase adhesion of the cathode material, the current collector may have fine unevenness formed on a surface thereof. The current collector may have various forms such as film, sheet, foil, net, a porous body, a foam body, a nonwoven body, etc.

The cathode for the lithium secondary battery may be formed by stacking a cathode material containing the cathode active material, the conductive material, the cathode additive, and the binder on the current collector.

According to another embodiment of the present disclosure, there is provided a lithium secondary battery including the cathode for a lithium secondary battery; an anode; a separator; and an electrolyte.

The lithium secondary battery includes a cathode containing the cathode additive. Accordingly, the lithium secondary battery can suppress gas generation in the cathode during charging and discharging, and can exhibit improved safety and lifespan characteristics. In addition, the lithium secondary battery may exhibit high discharge capacity, excellent output characteristics, and capacity retention.

Therefore, the lithium secondary battery may be used as a source of energy supply with improved performance and safety in the field of portable electronic devices such as mobile phones, laptop computers, tablet computers, mobile batteries, and digital cameras; and transportation means such as electric vehicles, electric motorcycles, and personal mobility devices.

The lithium secondary battery may include an electrode assembly wound with a separator interposed between the cathode and the anode, and a case in which the electrode assembly is embedded. In addition, the cathode, the anode, and the separator may be impregnated with an electrolyte.

The lithium secondary battery may have various shapes such as a prismatic shape, a cylindrical shape, a pouch shape, etc.

Regarding the matters of the cathode, refer to the description presented above.

The anode may include an anode material containing an anode active material, a conductive material, and a binder; and a current collector for supporting the anode material.

The anode active material may include a material capable of reversibly intercalating and deintercalating lithium ions, lithium metal, an alloy of lithium metal, a material capable of doping to and dedoping from lithium, and a transition metal oxide.

An example of the material capable of reversibly intercalating and deintercalating lithium ions may include crystalline carbon, amorphous carbon, or a mixture thereof as a carbonaceous material. Specifically, the carbonaceous material may be natural graphite, artificial graphite, Kish graphite, pyrolytic carbon, mesophase pitches, mesophase pitch-based carbon fiber, meso-carbon microbeads, petroleum or coal tar pitch derived cokes, soft carbon, hard carbon, etc.

The alloy of lithium metal may be an alloy of lithium and a metal selected from the group consisting of Na, K, Rb, Cs, Fr, Be, Mg, Ca, Sr, Si, Sb, Pb, In, Zn, Ba, Ra, Ge, Al, Sn, Bi, Ga, and Cd.

The material which may be doped to and dedoped from lithium may be Si, Si—C composite, $SiO_x$ ($0<x<2$), Si-Q alloy (wherein the Q is an element selected from the group consisting of an alkali metal, an alkaline earth metal, a group 13 element, a group 14 element, a group 15 element, a group 16 element, a transition metal, a rare earth element, and a combination thereof; but except for Si), Sn, $SnO_2$, a Sn—R alloy (wherein the R is an element selected from the group consisting of an alkali metal, an alkaline earth metal, a group 13 element, a group 14 element, a group 15 element, a group 16 element, a transition metal, a rare earth element, and a combination thereof; but except for Sn), etc. In addition, the material, which may be doped to and dedoped from lithium, used herein may include a mixture of $SiO_2$ and at least one of the above examples. The Q and R may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, etc.

In addition, the transition metal oxide may be vanadium oxide, lithium vanadium oxide, lithium titanium oxide, etc.

Preferably, the anode may include at least one anode active material selected from the group consisting of a carbonaceous material and a silicon compound.

That is, according to another embodiment of the present disclosure, there is provided a lithium secondary battery including the cathode for a lithium secondary battery; an anode containing at least one anode active material selected from the group consisting of carbonaceous materials and silicon compounds; a separator; and an electrolyte.

Herein, the carbonaceous material is at least one material selected from the group consisting of natural graphite, artificial graphite, Kish graphite, pyrolytic carbon, mesophase pitches, mesophase pitch-based carbon fiber, meso-carbon microbeads, petroleum or coal tar pitch derived cokes, soft carbon, and hard carbon. In addition, the silicon compound may be a compound containing Si, i.e., Si, Si—C composite, $SiO_x$ ($0<x<2$), Si-Q alloy, a mixture thereof, or a mixture of at least one of these and $SiO_2$.

In addition, the anode may include micro silicon. When the anode includes the micro silicon, superior capacity may be achieved compared to a case where a carbonaceous material is used as an anode active material. Specifically, when specific micro silicon is used as the silicon compound, a remaining capacity of 80% or more can be maintained even after charging and discharging 500 times or more, and significantly superior energy density can be realized compared to conventional lithium secondary batteries. In addition, when the anode includes micro silicon, charge/discharge lifespan of a solid battery using a solid electrolyte can be greatly increased, and charging speed at room temperature can be also greatly improved.

Although the size of the micro silicon is not particularly limited, the micro silicon may have a diameter of 100 μm or less, 1 to 100 μm, or 1 to 20 μm.

According to one embodiment, the anode active material may be included in an amount of 85 wt % to 98 wt % based on a total weight of the anode material.

Specifically, the content of the anode active material may be 85 wt % or more, 87 wt % or more, or 90 wt % or more; and 98 wt % or less, 97 wt % or less, or 95 wt % or less based on a total weight of the anode material.

Preferably, the content of the anode active material may be 85 wt % to 97 wt %, 87 wt % to 97 wt %, 87 wt % to 95 wt %, or 90 wt % to 95 wt % based on a total weight of the anode material.

Regarding the matters of the conductive material and the binder included in the anode material, and the current collector, refer to the description presented in the cathode for a lithium secondary battery.

The separator separates the cathode and the anode, and provides a passage for lithium ions to move. As the separator, a separator known to be applicable to the lithium secondary battery in the art to which the present invention pertains may be used without any particular limitation. It is preferable that the separator has excellent wettability to the electrolyte while having low resistance to ionic migration of the electrolyte.

Specifically, the separator may be a porous polymer film made of a polyolefin-based polymer such as polyethylene, polypropylene, ethylene-butene copolymer, ethylene-hexene copolymer, ethylene-methacrylate copolymer, etc. The separator may be a multilayer film in which the porous polymer films are laminated in two or more layers. The separator may be a nonwoven fabric including glass fibers, polyethylene terephthalate fibers, etc. In addition, the separator may be coated with a ceramic component or a polymer material in order to secure heat resistance or mechanical strength.

As the electrolyte, an electrolyte known to be applicable to the lithium secondary battery in the art to which the present invention pertains may be used without any particular limitation. For example, the electrolyte may be an organic liquid electrolyte, an inorganic liquid electrolyte, a solid polymer electrolyte, a gel-type polymer electrolyte, a solid inorganic electrolyte, a molten inorganic electrolyte, etc.

Specifically, the electrolyte may include a non-aqueous organic solvent and a lithium salt.

The non-aqueous organic solvent may be used without any particular limitation as long as it may serve as a medium through which ions involved in an electrochemical reaction of the battery may move.

Specifically, the non-aqueous organic solvent may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a C2 to C20 linear, branched or cyclic hydrocarbon group, which may include a double bond aromatic ring or an ether bond); amides such as dimethylformamide; dioxolanes such as 1,3-dioxolane; sulfolane; and the like.

Among the above examples, a carbonate-based solvent may be preferably used as the non-aqueous organic solvent.

In particular, in consideration of the battery charge/discharge performance and compatibility with the sacrificial positive electrode material, the non-aqueous organic solvent used herein may preferably be a mixture of cyclic carbonates (for example, ethylene carbonate and propylene carbonate) having high ionic conductivity and high dielectric constant and linear carbonates (for example, ethyl methyl carbonate, dimethyl carbonate and diethyl carbonate) having low viscosity. When the cyclic carbonate and the linear carbonate are mixed at a volume ratio of 1:1 to 1:9 and used, it may be advantageous for expressing the performance described above.

In addition, the non-aqueous organic solvent used herein may preferably include a mixture of ethylene carbonate (EC) and ethyl methyl carbonate (EMC) at a volume ratio of 1:2 to 1:10; or a mixture of ethylene carbonate (EC), ethyl methyl carbonate (EMC) and dimethyl carbonate (DMC) at a volume ratio of 1~3:1~9:1.

The lithium salt included in the electrolyte may be dissolved in the non-aqueous organic solvent so as to act as a source of supplying lithium ions in the battery, thereby enabling the lithium secondary battery to basically operate and playing a role to promote the movement of lithium ions between the cathode and the anode.

Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiN(SO_2F)_2$ (LiFSI, lithium bis(fluorosulfonyl) imide), LiCl, LiI, $LiB(C_2O_4)_2$, and the like. Preferably, the lithium salt may be $LiPF_6$, LiFSI, or a mixture thereof.

The lithium salt may be included in the electrolyte at a concentration of 0.1 M to 2.0 M. The lithium salt included within the concentration range may impart appropriate conductivity and viscosity to the electrolyte, thereby enabling excellent electrolyte performance.

Optionally, the electrolyte may include additives for the purpose of improving battery lifespan, suppressing reduction in battery capacity, and improving a battery discharge capacity.

For example, the additive may include haloalkylene carbonate-based compounds such as difluoroethylene carbonate, pyridine, triethyl phosphite, triethanolamine, cyclic ether, ethylene diamine, n-glyme, hexaphosphoric triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, etc. The additive may be included in an amount of 0.1 wt % to 5 wt % based on a total weight of the electrolyte.

Advantageous Effects

According to the present disclosure, there is provided a manufacturing method of a cathode additive for a lithium secondary battery having high initial irreversible capacity and excellent air stability. The cathode additive manufactured thereby can compensate for the loss of irreversible capacity of the high-capacity lithium secondary battery, while effectively suppressing gas generation of the battery or fire and explosion caused thereby.

BRIEF DESCRIPTION OF THE DRAWINGS

FIG. 1 is a schematic diagram showing a simplified cross section of cathode additive particles for a lithium secondary battery according to an embodiment of the present invention.

FIGS. 2 and 3 are scanning electron microscope (SEM) images of cathode additives prepared in Example 1 and Comparative Example 3.

DESCRIPTION OF SYMBOLS

Figure 4:
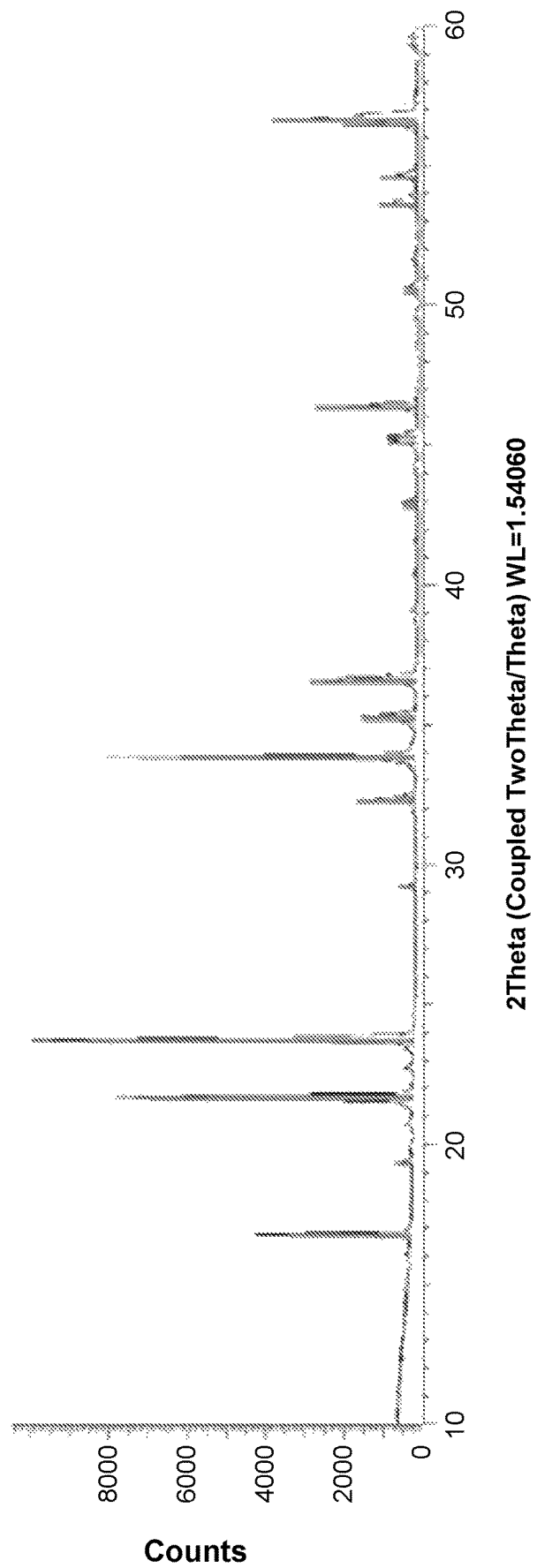
FIGS. 4 to 11 are X-ray diffraction (XRD) analysis results of cathode additives prepared in Examples and Comparative Examples.

10: Lithium-iron oxide particles
20: Carbon coating layer
30: Carbon nanotube-containing layer
40: Lithium difluoro(oxalato)borate-containing layer

DETAILED DESCRIPTION OF THE EMBODIMENTS

Hereinafter, the function and effect of the present invention will be described in more detail through specific examples. However, these examples are provided for illustrative purposes only. The scope of the invention is not intended to be limited by these examples, and it is apparent to those skilled in the art that various changes and modifications can be made within the scope and spirit of the present invention.

Example 1

(1) Preparation of Cathode Additive

A 0.2 L reactor and a mechanical stirrer were used, and the cathode additive of Example 1 was prepared according to the following method.

An aqueous dispersion of carbon nanotubes manufactured by LG Chem was used. The aqueous dispersion was prepared by mixing 5.83 wt % of carbon nanotubes (CNT) and 1.0 wt % of polyvinylpyrrolidone (manufactured by Acros organics, Mw 50,000 g/mol), which is a water-soluble polymer dispersant, in 200 ml of DI water using an ultrasonic tip for 10 minutes.

0.6 mol of iron(III) nitrate nonahydrate (manufactured by Daejung Chemical, 242.328 g) was dissolved in 600 ml of DI water, and slowly added to a flask containing 28 g of the CNT aqueous dispersion (CNT content compared to iron oxide-carbon precursor ($Fe_2O_3$—CNT precursor) to be formed in the subsequent process=3.3 wt %), followed by stirring for 30 minutes. Subsequently, 1.8 mol (252.36 g) of $NH_4OH$ was slowly poured into the flask, stirred for 30 minutes, and reacted at 80° C. for 6 hours.

After completion of the reaction, the mixture was allowed to stand for 30 minutes, the upper layer solution was discarded, and filtration was performed, followed by drying in a convection oven at 120° C. for 12 hours. The dried powder was heat-treated at 250° C. for 6 hours under an air atmosphere to remove impurities, and an iron oxide-carbon precursor ($Fe_2O_3$—CNT precursor) was obtained.

$Li_2O$ (manufactured by Ganfeng Lithium) and the $Fe_2O_3$—CNT precursor were uniformly mixed at a molar ratio of 5:1, and calcined at 600° C. (heating for 2 hours, maintaining for 6 hours) under an Ar atmosphere in a heat-treatment furnace to obtain lithium-iron oxide particles.

8.0 parts by weight of lithium difluoro(oxalato)borate (manufactured by Sigma-Aldrich) was mixed with 100 parts by weight of the lithium-iron oxide particles using a mixer. The mixture was calcined in a heat-treatment furnace at 270° C. under an air atmosphere for 1 hour, and then quenched to obtain a cathode additive of Example 1.

(2) Manufacture of Lithium Secondary Battery

The lithium transition metal oxide, carbon black as a conductive material, and polyvinylidene fluoride (PVdF) as a binder were mixed at a weight ratio of 90:4:6 in an organic solvent (N-methylpyrrolidone) to prepare a cathode material slurry. The cathode material slurry was coated on one side of a current collector, which is an aluminum foil having a thickness of 15 μm, and was rolled and dried to prepare a cathode (cutting size: ϕ14 mm).

A lithium secondary battery in the form of a coin cell was prepared by preparing the cathode, an anode, a separator, and an electrolyte solution. At this time, 300 μm thick Li-metal (cutting size: ϕ14 mm) was used as the anode. The electrolyte solution was prepared by dissolving 1.0 M of $LiPF_6$ and 2 wt % of vinylene carbonate (VC) in a non-aqueous organic solvent in which ethylene carbonate (EC), dimethyl carbonate (DMC) and diethyl carbonate (DEC) were mixed in a volume ratio of 1:2:1. And, as the separator, a PE resin separator (manufactured by W-scope, WL20C, 20 μm) was used.

Example 2

A cathode additive of Example 2 and a lithium secondary battery including the same were prepared in the same manner as in Example 1, except that the content of the lithium difluoro(oxalato)borate was increased to 15.0 parts by weight based on 100 parts by weight of the lithium-iron oxide particles.

Example 3

A cathode additive of Example 3 and a lithium secondary battery including the same were prepared in the same manner as in Example 1, except that the content of the CNT aqueous dispersion was increased to 34 g (CNT content compared to $Fe_2O_3$—CNT precursor to be formed in the subsequent process=4.0 wt %).

Example 4

Lithium-iron oxide particles were obtained in the same manner as in Example 1. 15.0 parts by weight of lithium difluoro(oxalato)borate (manufactured by Sigma-Aldrich) was mixed with 100 parts by weight of the lithium-iron oxide particles using a mixer.

The mixture was calcined in a heat-treatment furnace at 280° C. under an air atmosphere for 1 hour, and then quenched to obtain a cathode additive of Example 4.

A lithium secondary battery was manufactured in the same manner as in Example 1 using the cathode additive.

Example 5

Lithium-iron oxide particles were obtained in the same manner as in Example 1. 15.0 parts by weight of lithium difluoro(oxalato)borate (manufactured by Sigma-Aldrich) was mixed with 100 parts by weight of the lithium-iron oxide particles using a mixer.

The mixture was first calcined in a heat-treatment furnace at 270° C. under an argon atmosphere for 1 hour, secondly calcined at 270° C. under an air atmosphere for 1 hour, and then quenched to obtain a cathode additive of Example 5.

A lithium secondary battery was manufactured in the same manner as in Example 1 using the cathode additive.

Comparative Example 1

1.494 g of $Li_2O$ (manufactured by Ganfeng Lithium) and 1.597 g of $Fe_2O_3$ (manufactured by Sigma-Aldrich) were mixed in a solid phase (molar ratio $Li_2O:Fe_2O_3$=5:1). The mixture was prepared in the form of pellets using a press, and calcined in a heat-treatment furnace at 270° C. under an air atmosphere for 1 hour to obtain a cathode additive of Comparative Example 1.

A lithium secondary battery of Comparative Example 1 was manufactured in the same manner as in Example 1, except that the cathode additive was used.

Comparative Example 2

1.494 g of $Li_2O$ (manufactured by Ganfeng Lithium) and 1.597 g of $Fe_2O_3$ (manufactured by Sigma-Aldrich) were mixed in a solid phase (molar ratio $Li_2O:Fe_2O_3$=5:1). 0.4 g (4 g of polyvinylpyrrolidone based on 0.1 mol of cathode additive ($Li_5FeO_4$) to be prepared) of polyvinylpyrrolidone (manufactured by Acros organics, Mw 50,000 g/mol) was added to the mixture, and mixed. The mixture was prepared in the form of pellets using a press, and calcined in a heat-treatment furnace at 270° C. under an air atmosphere for 1 hour to obtain a cathode additive of Comparative Example 2.

A lithium secondary battery of Comparative Example 2 was manufactured in the same manner as in Example 1, except that the cathode additive was used.

Comparative Example 3

1.494 g of $Li_2O$ (manufactured by Ganfeng Lithium) and 1.597 g of $Fe_2O_3$ (manufactured by Sigma-Aldrich) were mixed in a solid phase (molar ratio $Li_2O:Fe_2O_3$=5:1). 10 wt % of carbon nanotubes (CNT) were added to the mixture, and mixed. The mixture was prepared in the form of pellets using a press, and calcined in a heat-treatment furnace at 270° C. under an air atmosphere for 1 hour to obtain a cathode additive of Comparative Example 3. A lithium secondary battery of Comparative Example 3 was manufactured in the same manner as in Example 1, except that the cathode additive was used.

Comparative Example 4

Lithium-iron oxide particles were obtained in the same manner as in Example 1. 15.0 parts by weight of lithium difluoro(oxalato)borate (manufactured by Sigma-Aldrich) was mixed with 100 parts by weight of the lithium-iron oxide particles using a mixer.

The mixture was calcined in a heat-treatment furnace at 270° C. under an argon atmosphere for 1 hour, and then quenched to obtain a cathode additive of Comparative Example 4.

A lithium secondary battery was manufactured in the same manner as in Example 1 using the cathode additive.

Comparative Example 5

Lithium-iron oxide particles were obtained in the same manner as in Example 1. 15.0 parts by weight of lithium difluoro(oxalato)borate (manufactured by Sigma-Aldrich) was mixed with 100 parts by weight of the lithium-iron oxide particles using a mixer.

The mixture was calcined in a heat-treatment furnace at 320° C. under an air atmosphere for 1 hour, and then quenched to obtain a cathode additive of Comparative Example 5.

A lithium secondary battery was manufactured in the same manner as in Example 1 using the cathode additive.

Comparative Example 6

Lithium-iron oxide particles were obtained in the same manner as in Example 1. 6 parts by weight of oxalic acid, 4 parts by weight of boric acid, and 11 parts by weight of lithium bis(fluorosulfonyl)imide (Li-FSI, manufactured by Nippon Shokubai) were mixed with 100 parts by weight of the lithium-iron oxide particles using a mixer.

The mixture was calcined in a heat-treatment furnace at 270° C. under an air atmosphere for 1 hour, and then quenched to obtain a cathode additive of Comparative Example 6.

A lithium secondary battery was manufactured in the same manner as in Example 1 using the cathode additive.

Comparative Example 7

Lithium-iron oxide particles were obtained in the same manner as in Example 1. 6 parts by weight of oxalic acid, 4 parts by weight of boric acid, and 6 parts by weight of lithium bis(trifluoromethanesulfonyl)imide (Li-TFSI, manufactured by J&H Chemical) were mixed with 100 parts by weight of the lithium-iron oxide particles using a mixer.

The mixture was calcined in a heat-treatment furnace at 270° C. under an air atmosphere for 1 hour, and then quenched to obtain a cathode additive of Comparative Example 7.

A lithium secondary battery was manufactured in the same manner as in Example 1 using the cathode additive.

Experimental Example 1

Scanning electron microscope (SEM) images of the cathode additives prepared in Example 1 and Comparative Example 3 are shown in FIG. 2 (Example 1) and FIG. 3 (Comparative Example 3).

Figure 5:
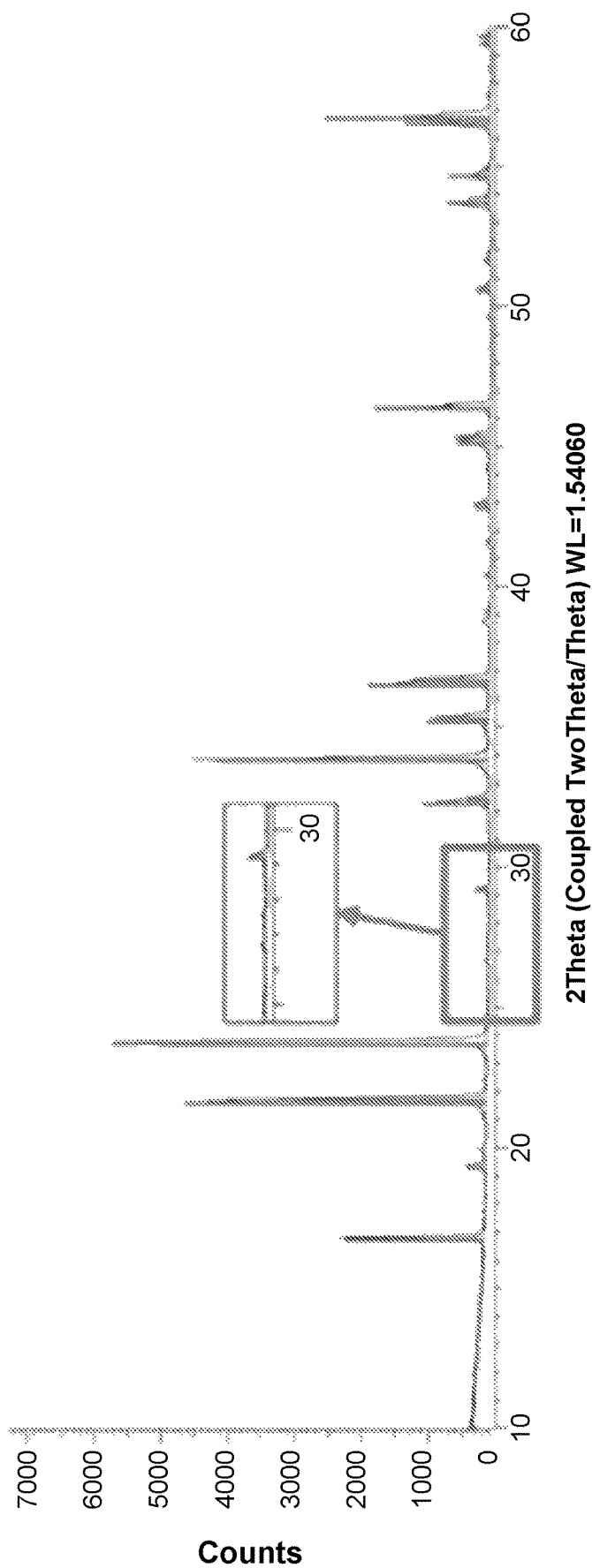
Figure 6:
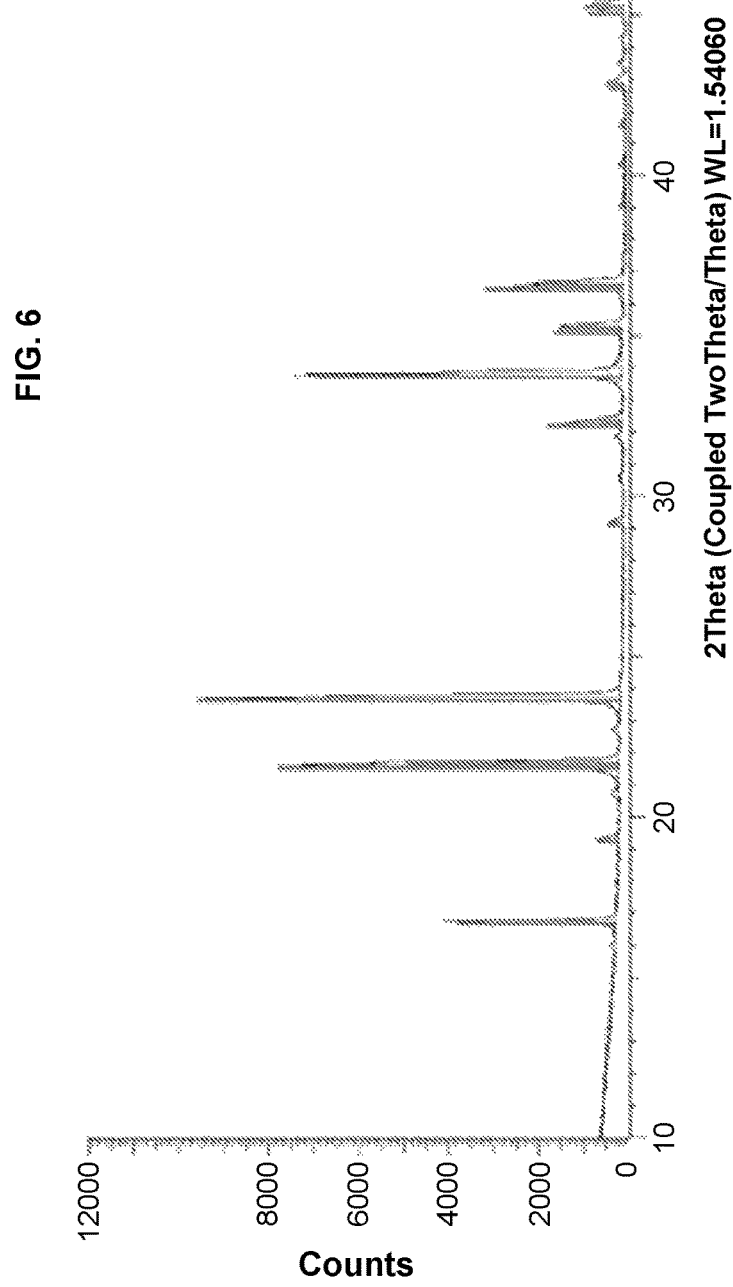
Figure 7:
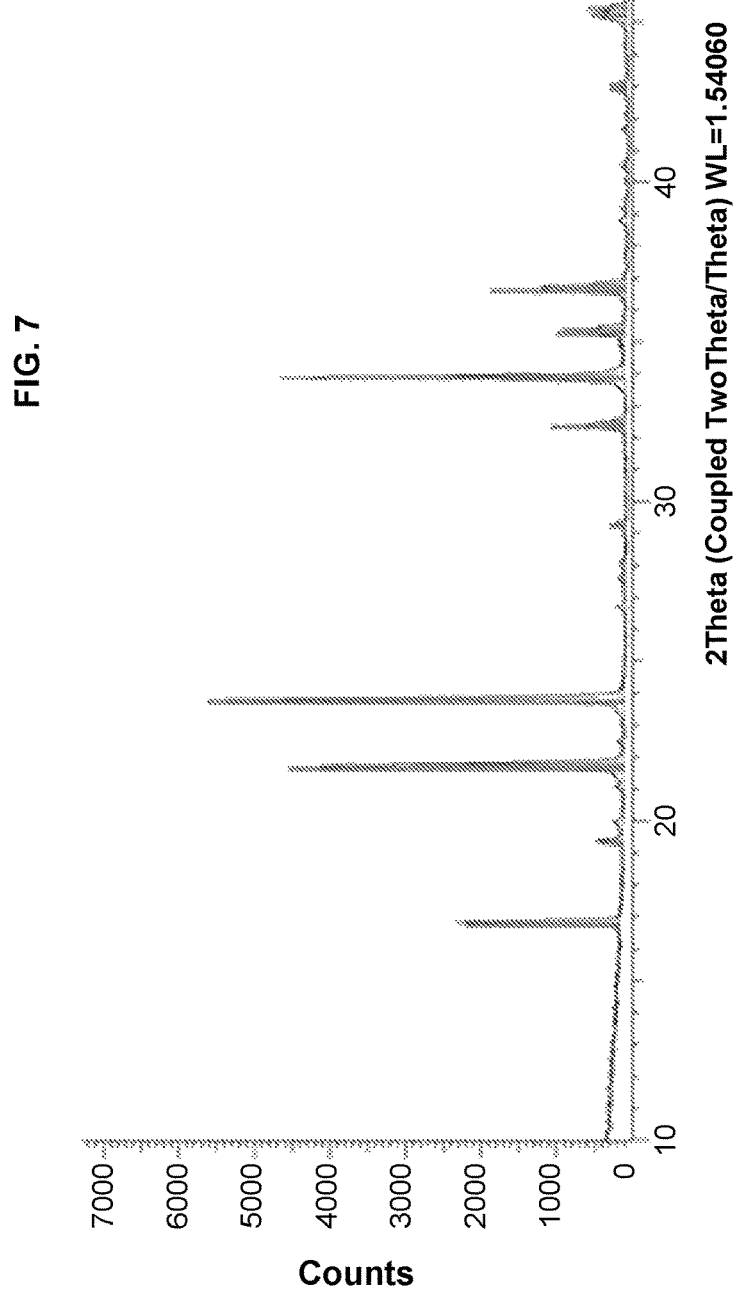
Figure 8:
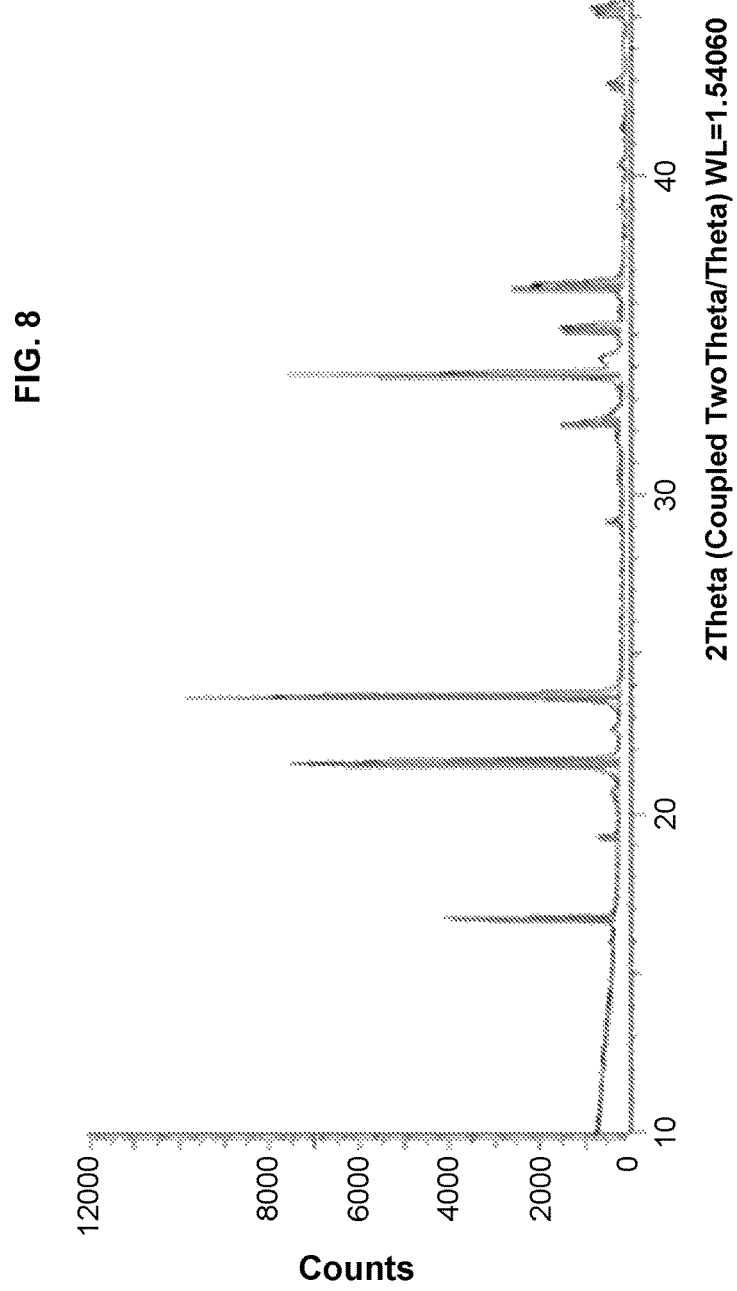
Figure 9:
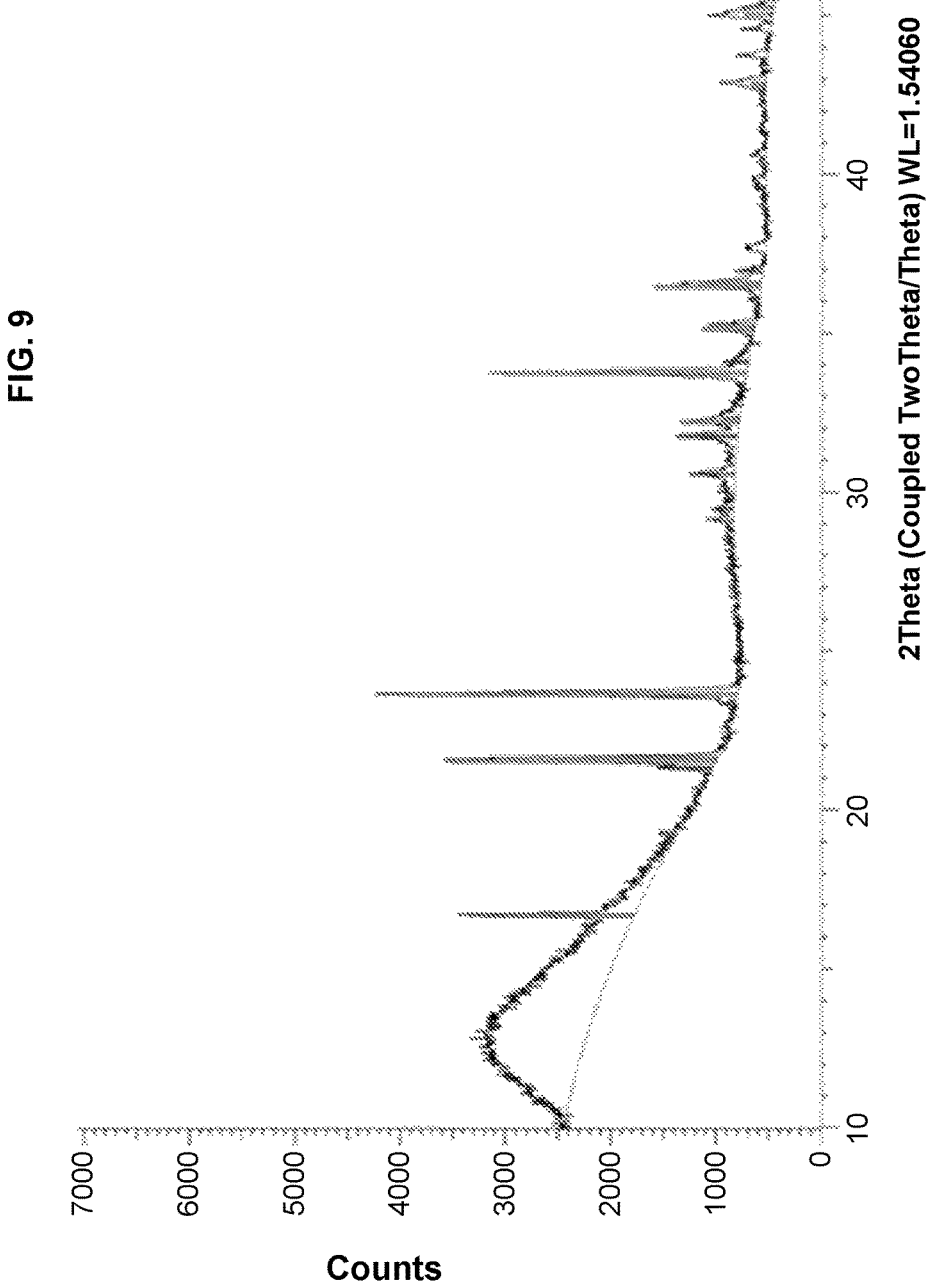
Figure 10:
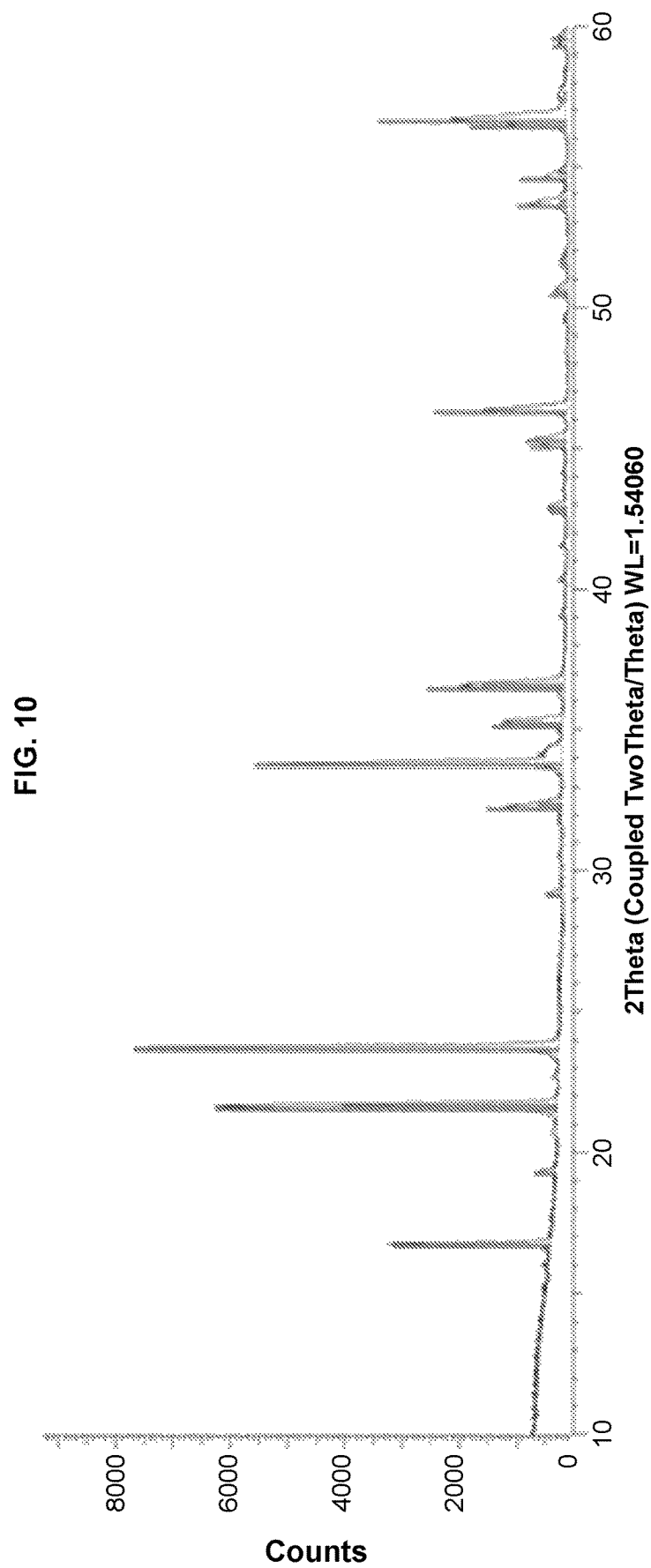
Figure 11:
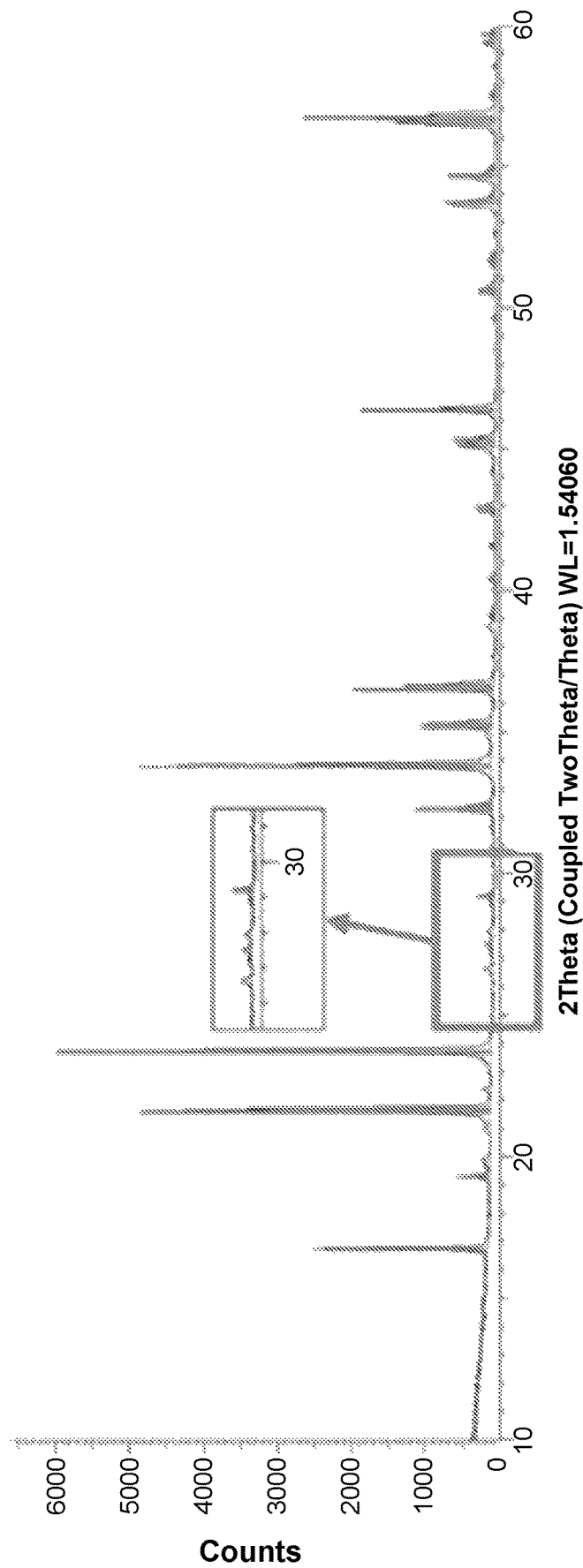

X-ray diffraction analysis (D8 Endeavor, Bruker) results of the cathode additives prepared in Examples and Comparative Examples are shown in FIG. 4 (Example 1), FIG. 5 (Example 2), FIG. 6 (Example 3), FIG. 7 (Example 5), FIG. 8 (Comparative Example 1), FIG. 9 (Comparative Example 2), FIG. 10 (Comparative Example 3), and FIG. 11 (Comparative Example 4).

Referring to the analysis results of scanning transmission microscope and XRD, it was confirmed that lithium transition metal oxide of $Li_5FeO_4$ was formed in the cathode additives of Examples, and a double coating layer including a carbon coating layer derived from polyvinylpyrrolidone (PVP) and a carbon nanotube-containing layer was formed on the lithium transition metal oxide particles to a thickness of 10 to 300 nm. It was also confirmed that a lithium difluoro(oxalato)borate-containing layer was formed on the surface of the lithium transition metal oxide.

Referring to FIG. 5 (Example 2) and FIG. 11 (Comparative Example 4), almost no peak appeared in the 2Theta range of 26 to 28 degrees in Example 2 calcined under an air atmosphere, but relatively strong and numerous peaks appeared in the 2Theta range in Comparative Example 4 calcined under an argon gas atmosphere. From these results, it was confirmed that a better LiDFOB coating effect with almost no impurities could be obtained when the heat-treatment was performed under an air atmosphere.

Experimental Example 2

(1) Charge/Discharge Capacity

A charge/discharge experiment was conducted by charging the lithium secondary batteries prepared in Examples and Comparative Examples up to 4.25 V under a constant current of 60 mA/g and a constant voltage of 30 mA/g at 45° C., and discharging to 2.5 V under a constant current of 10 mA/g. Charge capacity, and discharge capacity were calculated through the charge/discharge experiment, respectively.

(2) Charge Capacity Retention after Aging

The lithium secondary batteries prepared in Examples and Comparative Examples were stored in an air atmosphere chamber maintained at a temperature of 30° C. and a relative humidity of 33% (33 RH %) for 6 hours. Thereafter, the charge/discharge experiment was performed on the lithium secondary batteries under the same conditions. A ratio (capacity retention, %) of charge capacity after storage in the chamber to charge capacity before storage in the chamber was calculated.

TABLE 1

|  | Charge capacity (mAh/g) | Discharge capacity (mAh/g) | Charge capacity retention after aging (%) |
| --- | --- | --- | --- |
| Example 1 | 639.59 | 66.82 | 85.5 |
| Example 2 | 598.08 | 63.52 | 92.2 |
| Example 3 | 551.58 | 45.60 | 85.5 |
| Example 4 | 598.08 | 63.52 | 92.2 |
| Example 5 | 573.74 | 65.47 | 85.6 |
| Comparative Example 1 | 733.68 | 68.55 | 26.9 |
| Comparative Example 2 | 21.97 | 3.64 | Not measurable |
| Comparative Example 3 | 595.63 | 38.55 | Not measurable |
| Comparative Example 4 | 578.73 | 60.24 | 81.5 |
| Comparative Example 5 | 502.49 | 46.03 | 97.8 |
| Comparative Example 6 | 492.83 | 44.89 | 46.4 |
| Comparative Example 7 | 520.83 | 45.64 | 58.4 |

Referring to Table 1, it was confirmed that the lithium secondary batteries of Examples had a high charge capacity retention of 85% or more after aging while exhibiting a charge capacity of 550 mAh/g or more, and maintained a color similar to that of the electrode film before aging to have excellent air stability.

In contrast, the lithium secondary battery of Comparative Example 1 exhibited a relatively high charge capacity, but the charge capacity retention after aging was remarkably low. The lithium secondary battery of Comparative Example 2 exhibited poor charge capacity, and it was impossible to measure the charge capacity retention as the electrode film was distorted during the aging test. The lithium secondary battery of Comparative Example 3 exhibited good charge capacity, but the electrode film was distorted to the extent that performance measurement was impossible during the aging test. Although the lithium secondary battery of Comparative Example 4 exhibited good charge capacity, it was confirmed that the charge capacity retention after aging was relatively poor.

As the lithium secondary battery of Comparative Example 5 included the cathode additive heat-treated at a relatively high temperature, the charge capacity was significantly reduced. It was confirmed that this is because carbon components (carbon coating layer and carbon nanotube-containing layer) were lost due to the high-temperature heat treatment. However, in the lithium secondary battery of Comparative Example 5, the charge capacity retention after aging was slightly improved. This may be because the specific surface area of the cathode additive decreased due to the loss of the carbon components, and thus a coating efficiency of lithium difluoro(oxalato)borate was relatively improved.

Although a combination of compounds having a similar structure was added instead of lithium difluoro(oxalato) borate in the lithium secondary batteries of Comparative Examples 6 and 7, it was confirmed that the charge capacity was relatively low, and the charge capacity retention after aging was also remarkably low.

In the above, although the present invention has been described with reference to limited embodiments and drawings, the present invention is not limited thereto, and various modifications and variations are possible within the technical idea of the present invention and within the equivalent scope of the claims to be described below by those skilled in the art to which the present invention pertains.

The invention claimed is:

1. A method of manufacturing a cathode additive for a lithium secondary battery, comprising:
    mixing and heat-treating carbon nanotubes, a water-soluble polymer dispersant, and an iron (Fe) precursor to form an iron oxide-carbon precursor;
    mixing and calcining a lithium precursor and the iron oxide-carbon precursor at a temperature of 500° C. or higher to form lithium-iron oxide particles; and
    mixing the lithium-iron oxide particles and a lithium difluoro(oxalato)borate to form a mixture;
    heat-treating the mixture under an oxygen-containing gas atmosphere at a temperature of less than 300° C. to form a lithium-iron oxide coated with a lithium difluoro (oxalato)borate-containing layer.

2. The method of manufacturing the cathode additive for the lithium secondary battery of claim 1,
    wherein the lithium difluoro(oxalato)borate is mixed in an amount of 5.0 parts by weight to 20.0 parts by weight based on a total amount of the lithium-iron oxide particles.

3. The method of manufacturing the cathode additive for a lithium secondary battery of claim 1,
    wherein the heat-treating the mixture containing the lithium-iron oxide particles and the lithium difluoro (oxalato)borate is performed under an air atmosphere at a temperature of 260° C. to 280° C.

4. The method of manufacturing the cathode additive for the lithium secondary battery of claim 1,
    wherein the heat-treating the mixture containing the lithium-iron oxide particles and the lithium difluoro (oxalato)borate comprises:
    first heat-treating the mixture containing the lithium-iron oxide particles and the lithium difluoro(oxalato)borate under an inert gas atmosphere at a temperature of less than 300° C. to form a first heat-treated mixture; and
    secondly heat-treating the first heat-treated mixture under an oxygen-containing gas atmosphere at a temperature of less than 300° C.

5. The method of manufacturing the cathode additive for the lithium secondary battery of claim 1,
    wherein the water-soluble polymer dispersant comprises at least one of polyvinylpyrrolidone-based polymers, polyacrylic acid-based polymers, polyvinyl alcohol-based polymers, or hydroxyalkyl cellulose-based polymers.

6. The method of manufacturing the cathode additive for the lithium secondary battery of claim 1,
    wherein the water-soluble polymer dispersant is used in an amount of 0.1 parts by weight to 2 parts by weight based on a total amount of the iron oxide-carbon precursor.

7. The method of manufacturing the cathode additive for the lithium secondary battery of claim 1,
    wherein the carbon nanotubes are used in an amount of 1 parts by weight to 10 parts by weight based on a total amount of the iron oxide-carbon precursor.

8. The method of manufacturing the cathode additive for the lithium secondary battery of claim 1,
    wherein the iron (Fe) precursor comprises at least one compound of nitric oxides, sulfur oxides, phosphates, oxides, halides, or hydrates of Fe(III).

9. The method of manufacturing the cathode additive for the lithium secondary battery of claim 1,
    wherein mixing and heat-treating the carbon nanotubes, the water-soluble polymer dispersant, and the iron (Fe) precursor comprises:
    forming a carbon nanotube dispersion in which the carbon nanotubes are dispersed in an aqueous medium in the presence of the water-soluble polymer dispersant;
    mixing the carbon nanotube dispersion and the iron (Fe) precursor in the presence of a base to form a mixture;
    reacting the carbon nanotube dispersion and the iron (Fe) precursor in the mixture at a temperature of 50° C. to 100° C. to form a reaction product; and
    filtering and drying the reaction product solution, followed by heat-treating at a temperature of 200° C. to 300° C.

10. The method of manufacturing the cathode additive for the lithium secondary battery of claim 1,
    wherein the cathode additive further comprises:
    a carbon coating layer formed on the lithium-iron oxide particles;
    a carbon nanotube-containing layer formed on the carbon coating layer; and
    wherein the lithium difluoro(oxalato)borate-containing layer is formed on the carbon nanotube-containing layer.

11. The method of manufacturing the cathode additive for the lithium secondary battery of claim 1,
    wherein the calcining is performed at a temperature of from 500° C. to 1000° C.

* * * * *